Patented Apr. 19, 1927.

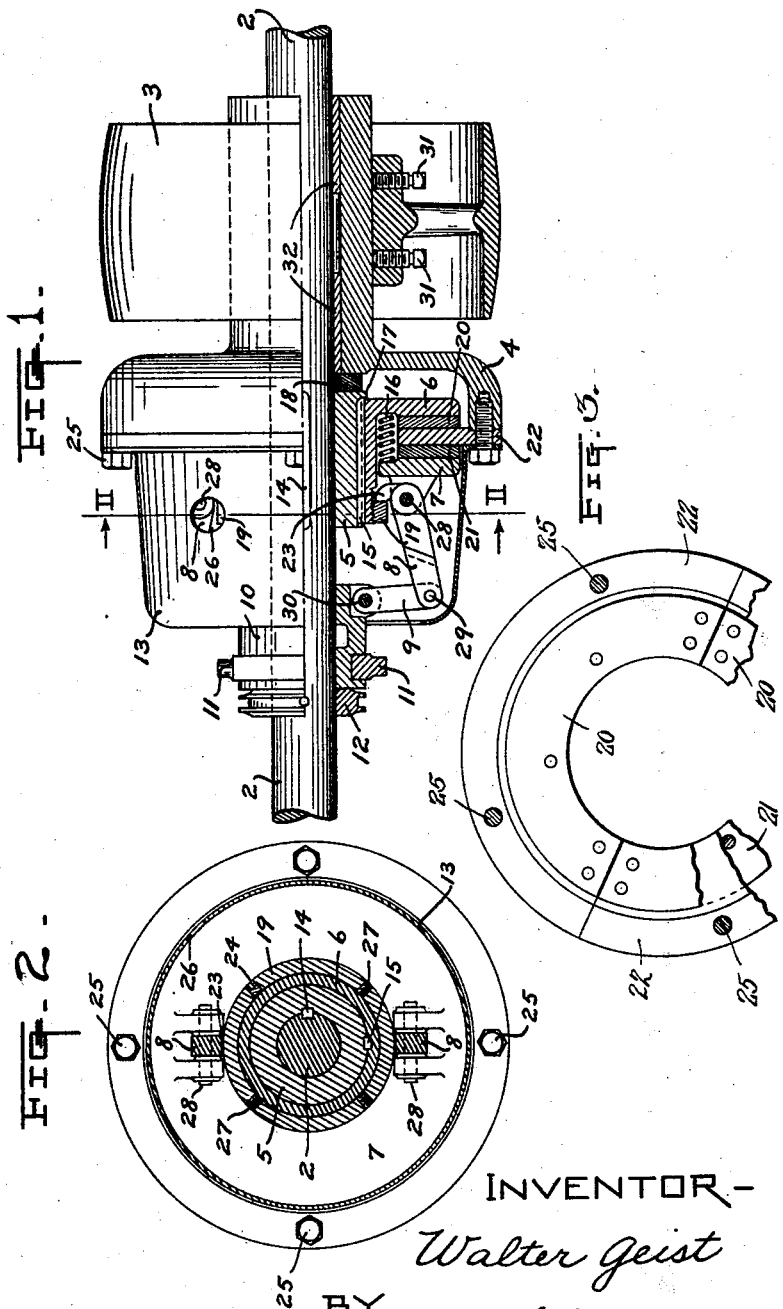

1,625,201

UNITED STATES PATENT OFFICE.

WALTER GEIST, OF MILWAUKEE, WISCONSIN, ASSIGNOR TO ACME CLUTCH COMPANY, OF MILWAUKEE, WISCONSIN.

FRICTION CLUTCH.

Application filed December 24, 1920. Serial No. 432,946.

This invention relates in general to improvements in the art of transmitting power from one rotary element to another, and relates more specifically to improvements in the construction and operation of friction clutches and the like.

An object of the invention is to provide a friction clutch which is simple in construction and efficient in operation.

Some of the more specific objects of the invention are as follows:—

To provide a clutch structure which is exceedingly simple and compact in construction and which presents a neat and highly finished appearance.

To provide a mechanism whereby a driven element may be rapidly and effectively connected to and disconnected from a driving source.

To provide means for effecting rapid and accurate adjustment of the various elements of a friction clutch to produce the desired conditions of operation.

To provide a rotary friction clutch in which the various elements are balanced and which may be readily dismantled and assembled for inspection and renewal of worn parts.

To provide a double grip clutch in which wear is uniformly distributed over relatively large surfaces.

To provide a device in which danger of injury to persons coming in contact therewith, is avoided by the provision of guards.

To provide a clutch mechanism which may be manufactured at small cost, in which various elements are interchangeable, and in which the cost of maintenance is reduced to a minimum.

To provide other improvements in the construction of clutch details, whereby the efficiency is enhanced to a maximum.

A clear conception of an embodiment of the invention and of the operation of a device constructed in accordance therewith, may be had by referring to the drawing accompanying and forming a part of this specification, in which like reference characters designate the same or similar parts in the several views.

Fig. 1 is a part sectional side view of an improved friction clutch.

Fig. 2 is a transverse section through the improved friction clutch, the section being taken along the line II—II of Fig. 1, looking in the direction of the arrows.

Fig. 3 is a fragmentary transverse section through the improved clutch, the section being taken closely adjacent to the driven friction plate and the renewable wearing plates associated therewith.

The friction clutch comprises in general a pair of annular relatively movable driving jaws 6, 7 a rotary driving element or shaft 2 drivingly associated with the jaws, an annular driven friction plate 22 adapted to be gripped by the jaws 6, 7, and a driven element or pulley 3 rigidly connected to the plate 22 by means of a plate carrier 4.

The driving element or shaft 2 receives rotary motion from any suitable source and has a collar or sleeve 5 rigidly secured thereto by means of a key 14. The sleeve 5 is provided with one or more longitudinal outer recesses within which are located splines 15. The annular movable driving jaw 6 has a central hub which is bored to slidably engage the sleeve 5 and which is longitudinally recessed to fit the splines 15. The sleeve 5 has an integral end flange or abutment 17 adapted to engage and limit the movement of the jaw 6 away from the plate 22. The end of the hub of the jaw 6 remote from this jaw is threaded and has an adjustable ring abutment 19 locked thereto by means of a set screw 24 coacting with one of a series of holes 27 in the ring. The annular movable driving jaw 7 surrounds the hub of the jaw 6 and has sets of ears projecting therefrom in a direction away from the jaw 6. Bifurcated links 8 are pivotally secured to the ears of the jaw 7 by means of pivot pins 28, and have inwardly extending jaw shifting lugs 23 engaging an end surface of the ring abutment 19. The jaws 6, 7 cooperate with renewable wearing plates 20, 21 made of fibre or similar material and interposed between the respective jaws and the intervening driven plate 22. The jaws 6, 7 and the wearing plates 20, 21 are ordinarily held out of intimate contact with each other by means of a series of compression springs 16.

Loosely embracing the shaft 2 at one end of the collar 5, is a collar or element 10 having therein an annular outer groove within which a shifting ring or yoke 11 coacts. The element 10 is prevented from moving longitudinally of the shaft 2 away from the collar 5, by means of a stop collar 12 fastened to the shaft 2 in any suitable manner. The element 10 is adapted to be shifted to the right from the position indicated in Fig. 1, by means of a lever, not shown, associated with the yoke 11. The outer extremities of the bifurcated links 8 are connected to ears formed on the element 10, by means of links 9 and pivot pins 29, 30. The links 8, 9 are disclosed as being disposed diametrically opposite and located equi-distant from the axis of the shaft 2. These links are always preferably located equi-distant around and away from the shaft axis in order to balance the structure and to produce uniform gripping pressure at the jaws. The number of sets of links 8, 9 desired, will depend upon the size of the clutch and the amount of power to be transmitted therethrough. The links 8, 9 and the elements associated therewith, are enclosed within an annular guard or casing 13 which is rigidly attached to the annular plate 22 by means of the same cap screws 25 which unite the plate 22 with the plate carrier 4. The guard casing 13 is provided with one or more local openings 26 which are located in the plane of the adjustable ring abutment 19, permitting direct access to this abutment for purposes of adjustment. The plate carrier 4 has an elongated integral hub which is provided with a bearing 32 loosely journalled upon the driving shaft 2. The hub of the plate carrier 4 has an end surface which coacts with a fibre collar or stop 18, which in turn coacts with the flanged end of the element 5. The driven element or pulley 3 is bored to fit the hub of the plate carrier 4 and is rigidly secured to the carrier by means of locking set screws 31.

As disclosed in the drawing, the driven element or pulley 3 is disconnected from the driving element or shaft 2 and the movable collar element 10 is in engagement with the stop collar 12. The driving and driven elements may be quickly connected to transmit rotary motion from the one to the other, by shifting the element 10 to the right or away from the stop 12. Such shifting of the collar or element 10 moves the inner pivots 30 of the links 9 to the right causing these links to assume positions substantially perpendicular relative to the axis of the shaft 2 and moving the pivot pins 29 away from the shaft 2. This outward movement of the pins 29 causes the bifurcated levers 8 to swing about their pivots 28, thus causing the lugs 23 to move the abutment 19 and the movable jaw 6 associated therewith toward the left, and simultaneously causing the pivots 28 and the movable jaw 7 associated therewith to move toward the right. As the annular jaws 6, 7 are thus moved toward each other, they press the fibre wearing plates or disks 20, 21 firmly against the interposed annular plate 22, imparting rotary motion to this plate and to the elements associated therewith. This motion of the jaws 6, 7 toward each other also compresses the springs 16 which coact directly with the jaws. Power may thus be transmitted from the shaft 2 to the pulley 3 by retaining the element 10 in shifted position.

If it is desired to disconnect the driving and driven elements, it is necessary only to return the element 10 to a position of engagement with the collar 12. By thus shifting the element 10, the links 8, 9 are released and restored to the position shown, and the springs 16 become effective to move the jaws 6, 7 away from the wearing plates 20, 21 and the intervening plate 22. During release of the jaws, movement of the jaw 6 toward the right and along the element 5 is limited by the flange abutment 17, while movement of the jaw 7 toward the left and along the hub of the jaw 6 is limited by the adjustable abutment 19. Movement of the plate carrier 4 and the plate 22 toward the left is limited by the stop collar 18.

Should it be desirable to vary the degree of gripping pressure exerted by the jaws 6, 7 for a predetermined amount of movement of the collar or element 10, it is necessary only to insert a wrench through the opening 26 in the cover 13 and to release the locking screw 24. A bar may then be inserted in one of the holes 27 of the ring abutment 19 through the opening 26, and the ring abutment thus held while the shaft 2 is slowly rotated to produce rotation of the jaws 6, 7 and the hub of the jaw 6 relatively to the abutment 19. Due to the screw thread coaction between the jaw hub and the ring abutment 19, the latter will by such relative rotation of the elements be shifted toward or away from the jaws 6, 7 the desired amount. Such adjustment of the ring abutment will vary the gripping pressure exerted by the jaws 6, 7 upon the plate 22, and may be quickly effected without removing the guard casing 13.

The fibre wearing disks 20, 21 are preferably formed of segments insertible transversely of the axis of the shaft 2 upon removal of the cap screws 25 which clamp the casing 13, plate 22 and the carrier 4 together. These disks 20, 21 may be secured either to the jaws 6, 7 or to the plate 22, attachment to the latter being preferable as both disks may be thus removed with the element 22 which may also be formed in sections. The symmetrical arrangement of the actuating links 8, 9 and the formation of the jaws 6, 7 and the plate 22 as rings, insures uniform distribution of the pressures upon the wearing disks 20, 21 thereby giving them maximum useful life. As these disks 20, 21 are subjected to the greatest wear, they are preferably formed of fibre or similar relatively cheap material capable of inducing maximum friction. The disks 20, 21 are of like structure thereby making them interchangeable. Other elements such as the links 8, 9 are also made identical in structure thus reducing to a minimum the cost of manufacture and of maintenance by providing interchangeable parts.

It will be obvious that the entire structure is relatively simple and exceedingly compact. The guard casing 13 gives a neat appearance to the assembled clutch and avoids injury to persons coming in contact with the device, such as would result if the revolving levers 8, 9 were unenclosed. The entire mechanism may be quickly dismantled by releasing the cap screws 25 and withdrawing the pivot pins 28, 29, 30. While the power has been described as being applied to the driving shaft 2, it will be obvious that the power may also be applied to the pulley 3 and the clutch utilized to produce rotation of the shaft 2 which would in such cases be the driven element.

It should be understood that it is not desired to limit the invention to the exact details of construction and of operation herein shown and described, for obvious modifications within the scope of the claims may occur to persons skilled in the art.

It is claimed and desired to secure by Letters Patent:—

1. In a clutch, a rotary shaft, a collar secured to said shaft and having an abutment, an annular jaw movable along said shaft toward and away from said abutment and having a sleeve slidably engaging said collar, a second annular jaw surrounding said sleeve and movable along said shaft toward and away from said first mentioned jaw, an element rotatably supported upon said shaft and having an annular portion interposed between said jaws, means associated with said second jaw and with said sleeve for moving said jaws toward said element portion, and means for spreading said jaws and for urging said first mentioned jaw toward said abutment.

2. In a clutch, a rotary shaft, a collar rigidly attached to said shaft and having an abutment, an annular jaw movable along said shaft toward and away from said abutment and having an integral sleeve splined upon said collar, a second annular jaw surrounding said sleeve and movable along said shaft toward and away from said first mentioned jaw, an element freely rotatable upon said shaft and having an annular portion interposed between said jaws, links pivotally associated with said second jaw and having lugs cooperable with said sleeve to move said jaws toward said element portion, and means for spreading said jaws and for urging said first mentioned jaw toward said abutment.

In testimony whereof, the signature of the inventor is affixed hereto.

WALTER GEIST.